United States Patent
Kaptcan et al.

(10) Patent No.: US 9,471,913 B1
(45) Date of Patent: *Oct. 18, 2016

(54) METHOD AND SYSTEM FOR CARDLESS PROCESSING OF E-INVOICING

(71) Applicant: Compass Plus US, Corp., Miramar, FL (US)

(72) Inventors: Anatolii V. Kaptcan, Miramar, FL (US); Yury Kolyakin, Miramar, FL (US); Aleksey Parshin, Miramar, FL (US); Andrei Chirkov, Miramar, FL (US)

(73) Assignee: Compass Plus US, Corp., Miramar, FL (US)

( * ) Notice: Subject to any disclaimer, the term of this patent is extended or adjusted under 35 U.S.C. 154(b) by 407 days.

This patent is subject to a terminal disclaimer.

(21) Appl. No.: 14/060,644

(22) Filed: Oct. 23, 2013

(51) Int. Cl.
*G06Q 40/00* (2012.01)
*G06Q 20/32* (2012.01)
*G06Q 20/40* (2012.01)

(52) U.S. Cl.
CPC .......... *G06Q 20/3221* (2013.01); *G06Q 20/40* (2013.01)

(58) Field of Classification Search
CPC .......... G06Q 20/3221; G06Q 20/105; G06Q 20/40; G06Q 20/3674
USPC .............................................. 705/41, 44, 67
See application file for complete search history.

(56) References Cited

U.S. PATENT DOCUMENTS

| 2012/0095855 | A1* | 4/2012 | Sterling | G06Q 30/0613 705/26.41 |
| 2012/0150742 | A1* | 6/2012 | Poon | G06Q 20/20 705/44 |
| 2013/0013507 | A1* | 1/2013 | Browning | G06Q 20/04 705/44 |
| 2014/0372319 | A1* | 12/2014 | Wolovitz | G06Q 30/06 705/44 |

FOREIGN PATENT DOCUMENTS

WO   WO 2013045898 A2 *  4/2013  ............. G06Q 30/06

* cited by examiner

*Primary Examiner* — Hunter Wilder
(74) *Attorney, Agent, or Firm* — Bardmesser Law Group

(57) ABSTRACT

A method for paying invoices using a mobile device. A retail enterprise (i.e., a seller) generates an invoice for goods or services that a client (i.e., a buyer) has selected. The invoice is stored in a database of a common payment service (CPS) and the invoice number is sent to buyer's mobile phone. The buyer uses his mobile phone to access his bank account via e-commerce 3-D Secure mechanism supported by the bank. The buyer is authenticated based on a procedure used by a particular bank. If the authentication is successful, the CPS initiates a payment for the seller's invoice. The payment information is sent to the buyer's mobile phone and also is sent to the seller for confirmation of closing the transaction.

10 Claims, 5 Drawing Sheets

METHOD AND SYSTEM FOR CARDLESS PROCESSING OF E-INVOICING

BACKGROUND OF THE INVENTION

1. Field of the Invention

The present invention relates to banking operations, and more particularly, to payment of invoices using a mobile device.

2. Description of the Related Art

Currently, there are a number of conventional methods for paying seller's invoices by the buyers. One conventional payment method uses bank debit or credit cards. The main shortcoming of this method is a low security. A client has to send a secret card data to the seller, who uses this data for taking the money from the client's bank account. The client's secret data goes through a long chain of intermediaries, such as: a POS terminal, a network, a service provider, an acquirer, a payment system and an issuer, etc.

Another shortcoming of the conventional payment method using bank debit cards is high transaction commissions (caused by a long chain of the above-mentioned intermediaries) and the risk reduction costs.

Another conventional payment method is Online Banking ePayments (OBeP) schema. These payment services have already taken a large share of Internet commerce. For example, in Germany, Giropay, http:**en.wikipedia.org/wiki/Giropay is widely used.

An iDEAL, http:**en.wikipedia.org/wiki/IDEAL payment system is used in Netherlands. In the United States http://www.securevaultpayments.org/ is used. The OBeP buying scenario is implemented as follows. A buyer of the Internet store is offered the OBeP as one of the payment methods. A brand name is used instead of the OBeP. The buyer selects a bank where he has an account. The buyer is referred to a bank authentication page. The authentication is performed using conventional means, such as a password, SMS, CAP, etc. The buyer confirms the payment. The payment amount is transferred to the seller's account. The seller receives a payment confirmation and ships the item(s) to the buyer.

The main problem with the OBeP is a difficulty of launching the service. Each bank, which wants to participate in the service, has to develop its own interface between the Internet bank system and the payment service. The interface is unique for each bank, and no general interface solution exists. This makes launching of the common payment service system expensive and creates delays, especially in case of a large number of the participants.

Accordingly, there is a need in the art for an effective and efficient method for payment for goods and services, which does not require significant modifications of the existing bank systems.

SUMMARY OF THE INVENTION

The present invention relates to banking operations, and more particularly, to payment of an invoice using a mobile phone that substantially obviates one or more of the disadvantages of the related art.

In one aspect, there is provided a method for paying invoices using a mobile device. A retailer (i.e., a seller) generates an invoice for goods or services that a client (i.e., a buyer) has selected. The invoice is stored in a database of a payment service and the invoice number is sent to the buyer's mobile phone.

The buyer uses his mobile phone to authenticate himself via e-commerce 3-D Secure mechanism supported by most banks. If the authentication is successful, the payment service initiates a payment for the seller's invoice. The payment information is sent to the buyer's mobile phone and also is sent to the seller for a confirmation of closing the transaction.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the embodiments of the present invention, examples of which are illustrated in the accompanying drawings.

A method, system and computer program product for paying invoices using a mobile device. In one aspect, there is provided a method for paying invoices using a mobile device. A retailer (i.e., a seller) generates an invoice for goods or services that a client (i.e., a buyer) has selected. The invoice is stored in a database of a payment service and the invoice number is sent to buyer's mobile phone.

The buyer uses his mobile phone to authenticate himself via an e-commerce 3-D Secure mechanism supported by most of the banks. If the authentication is successful, the payment service initiates a payment for the seller's invoice. The payment information is sent to the buyer's mobile phone and also is sent to the seller for a confirmation of closing the transaction.

According to the exemplary embodiment, the payment scheme can be easily implemented. The bank does not need to modify any of the existing systems and interfaces. The authentication and payment systems all can use standard interfaces. The buyer only needs to download a mobile application and perform a simple registration procedure. The seller also only needs to perform a simple registration procedure. In some cases, integration of the information systems is required. However, the integration is based on the standard protocols. The exemplary embodiment uses a proprietary mobile application designed to work with the payment service (PS). However, only one mobile application and one payment service are required. Each seller and the bank do not need to modify their existing systems.

Figure 1:
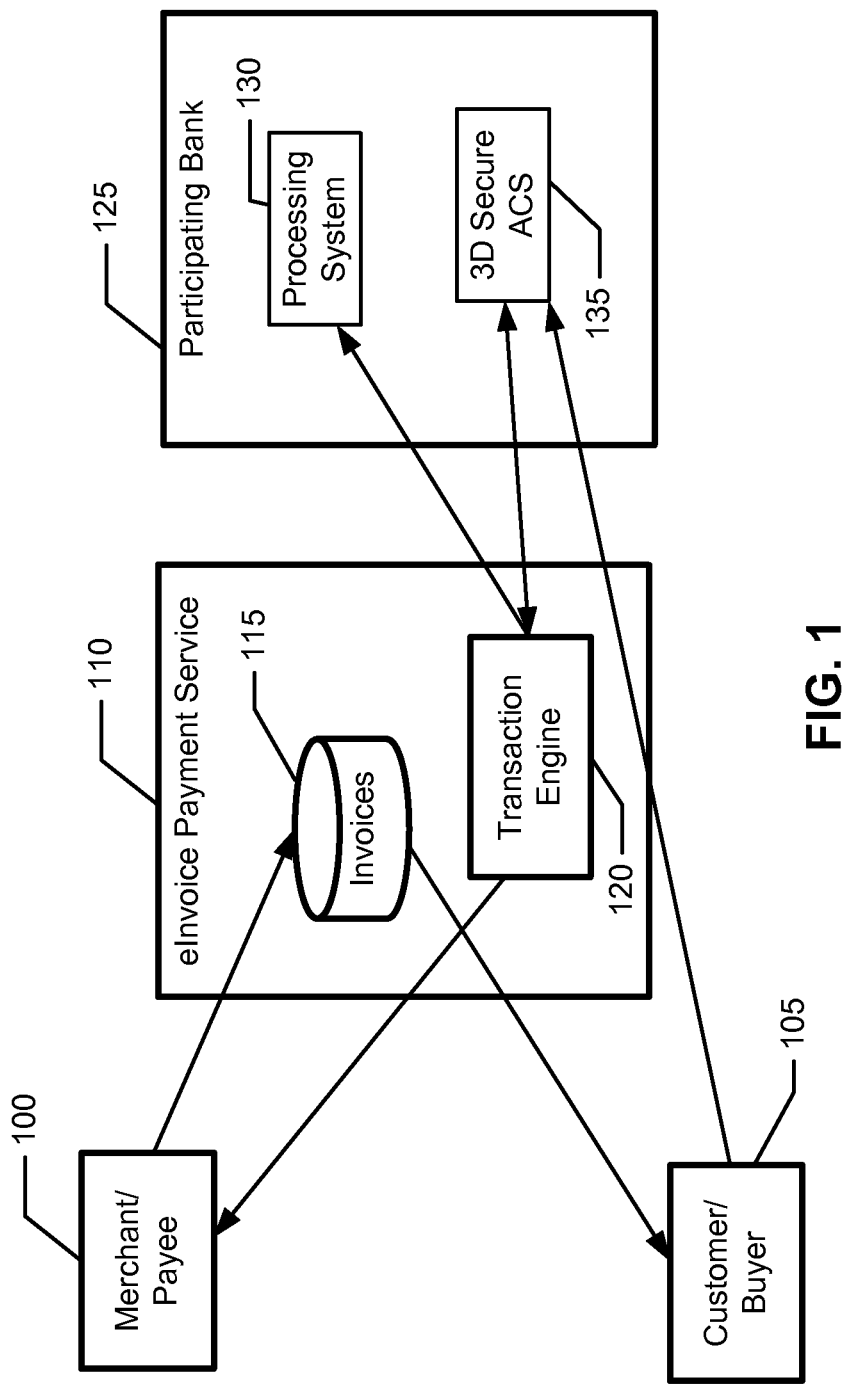
FIG. 1 illustrates system architecture, in accordance with the exemplary embodiment.

FIG. 1 illustrates system architecture, in accordance with the exemplary embodiment. The payment process, in accordance with the exemplary embodiment, is implemented as follows:

1. A seller 100 posts a payment request (i.e., the invoice 115). The invoice 115 is registered with the payment service host 110 (e.g., an eInvoice Payment Service);
2. A client (buyer) 105 receives the invoice 115 from the payment service 110 and starts the payment process;
3. The client 105 is authenticated by his bank 125 using 3D Secure procedure 135;
4. The bank 125 notifies the payment service 110 about successful authentication;
5. The payment service (PS) 110 executes a transaction using a transaction engine 120—the payment is transferred from the client's account to the Payment Service account by the bank 125 processing system 130 and the PS transfers the funds to the seller account.
6. The payment service (PS) 110 marks the invoice 115 as paid and notifies the seller (receiver) 105.

Note that the proposed payment scheme has a minimal number of the intermediaries compared to the conventional schemes. The buyer's secret data is only used by his bank. The proposed payment method can be illustrated by the following examples. The payment method can be used in the Internet on-line stores or for filling the on-line wallets (accounts).

1. A buyer selects a product in the on-line store and moves to payment;
2. The buyer selects a payment method (i.e., a brand of a payment service);
3. The on-line stores registers the invoice (without indicating the buyer) with the payment service (PS) and shows the invoice to the buyer;
4. The buyer launches a mobile application on his mobile phone, enters the invoice number and executes the payment;
5. The store receives the payment notification and prepares the product for shipping.

Note that the buyer selects the product using his web browser (on the computer or on the mobile device), but pays for the product using the mobile device.

Another exemplary scenario is payment for goods upon delivery. This payment method can be used by Internet stores that use courier services for delivering the goods. The payment method is implemented as follows:

1. A buyer selects a product and moves to payment;
2. The buyer selects a payment method—payment upon delivery;
3. The on-line store registers the invoice (without indicating the buyer) with the payment service (PS);
4. The on-line store provides the goods and the invoice number to the courier;
5. The courier delivers the goods to the buyer;
6. The buyer launches a mobile application on his mobile phone, enters the invoice number and executes the payment;
7. The courier receives the payment confirmation from the store and hands over the goods to the buyer.

Note that the courier can contact the store directly or check the payment status using a proprietary mobile application designed for a particular store. Another exemplary payment scenario is off-line payment. This payment method can be used in "bricks and mortar" stores where the payment time is not critical.

1. The retailer registers the invoice (without indicating the buyer) with the payment service (PS). The internet portal of the PS can be used or the seller can use an application integrated with the retailer system;
2. The seller provides the invoice number to the buyer. This can be done manually or via Bump or NFC;
3. The buyer launches the mobile application, receives and enters the invoice number and makes payment;
4. The seller checks the status of the invoice and hands over the goods to the buyer.

The above scenario can be used for large expensive purchases such as cars. This method has very low commissions and is very safe.

Another exemplary scenario is payments at an automated gas station.

1. The buyer at the gas station selects a payment method and enters the amount;
2. The gas station registers the invoice (without indicating the buyer) with the payment service;
3. The gas station provides the invoice number to the buyer;
4. The buyer launches the mobile application, enters the invoice number and makes a payment;
5. The gas station terminal checks the status of the invoice and pumps gas;
6. The gas station terminal corrects the invoice amount based on the actual amount of gas provided. The excess amount is credited back to the buyer. Another exemplary scenario is payment for gas at a not-automated gas station.

1. The cashier registers the invoice (without indicating the buyer) with the payment service;
2. The cashier provides the invoice to the buyer;
3. The buyer starts the mobile application, enters the invoice number and makes a payment according to the invoice;
4. The cashier checks the status of the invoice and starts the pump;
5. The cashier corrects the invoice amount based on the actual amount of gas provided. The excess amount is credited back to the buyer. Note that the buyer does not need to go back to the cashier for the overpayment amount.

Another example of using the exemplary payment method is pre-authorized payment. This type of payment can be used at hotels, at car rentals, etc.

1. The cashier registers the invoice (without indicating the buyer) in a pre-authorization mode;
2. The cashier provides the invoice number to the buyer;
3. The buyer launches the mobile application, enters the invoice number and performs pre-authorization;
4. The cashier finds the invoice and calculates a final amount to be received from the buyer.

The exemplary payment method can be used for small enterprises that do not have an IT system in place. This scenario can be implemented as follows:

1. The buyer provides his client ID or phone number or email address to the receiver;
2. The seller inputs the invoice on the payment service (PS) web site indicating the identification of the buyer. Alternatively, the invoice can be periodically reissued.
3. The buyer receives notification via an SMS or an email;
4. The buyer launches the mobile application and sees a list of his invoices;
5. The buyer pays the invoice;

6. The seller receives payment notification for the given invoice.

The exemplary payment method can be used for the enterprises that have an IT system in place. This scenario can be implemented as follows:

1. The buyer informs the receiver that he wants to use the payment service for paying his invoices and provides their client ID;
2. The seller provides the file with the invoices to the SM;
3. The SM ties the invoice to the buyer using a client ID;
4. The buyer receives notification via an SMS or an email;
5. The buyer launches the mobile application and sees a list of his invoices;
5. The buyer pays the invoice;
6. The PS provides a list of paid invoices to the receiver.

According to the exemplary embodiment, the exemplary method can be used for ATM cash withdrawals. This can be implemented as follows:

1. A client comes to an ATM, starts an operation of cardless withdrawal and enters the amount;
2. The acquirer host checks the availability of the requested amount in the ATM and registers the invoice with the PS;
3. The ATM displays the number of the invoice;
4. The client pays the invoice via mobile application;
5. The acquirer host waits for the completion of payment and gives the command for dispensing the cash; and
6. If a time out or an error occurs, the invoice is canceled. The PS reverses the transaction.

Note that the client can, advantageously, withdraw money from the ATM without using a debit card.

According to the exemplary embodiment, the clients can transfer funds to each other or to a card:

1. A sender initiates an operation in his mobile application and pays for money transfer;
2. The PS executes the money transfer;
3. The receiver receives a notification about the money transfer (if he is registered with the payment service). Note that the invoice is not used in this scenario.

According to the exemplary embodiment, a mobile application is distributed via AppStore, Google Play, etc. After the application is installed on the mobile device, the user has to register with the payment service. The user provides:

A number and an expiration date of his bank card;
A mobile phone number;
An email address;
A password;
A user name, date of birth, etc. (optional).

According to the exemplary embodiment, the payment service is configured as follows:

1. The PS sends the one-time passwords to the mobile phone or to the email address;
2. The client enters the passwords;
3. The PS registers the client and assigns the client ID. The client ID can be given to the payment receivers instead of a phone number of an email address;
4. The client ID is stored in the application configuration;
5. The PS checks the one-time passwords and performs the 3D Secure authentication of the client and collects the subscription fee.

According to the exemplary embodiment, the invoice can be process as follows:

1.1 The invoice number can be received from the seller. It can be entered manually or via Bump, NFS, etc.;
1.2 The invoice can be obtained by selecting it form the invoice list in the personal office;
2. The client enters the invoice and confirms the payment;

3. If the mobile application has several registered cards, the client selects one of the cards;
4. The mobile application sends an authentication request to the PS indicating the invoice number, a client ID and a card ID.

The PS performs the following operations:
1.1. Ties the invoice to the client;
1.2 Determines if the card belongs to a certain bank;
1.3 Sends a request VEReq to the bank ACS and receives the URL of the ACS authentication page;
1.4 Determines additional authentication options (a password and a CVV2 code) based on bank configuration.

The mobile application performs the following operations:
1. Requests the CVV2 and the personal office password (if required);
2. The mobile application opens the ACS authentication page in its browser and sends the PAReq request to the authentication page;
3. The bank ACS authenticates the client and refers the browser to the URL of completion of the PS authentication with transferring PARes (VEReq, PAReq, PARes are messages of the 3D Secure standard);
4. The browser is referred to the URL of the payment result. This URL belongs to the PS;
5. The PS checks the PARes and makes the payment;
6. The mobile application intercepts the switch to the URL, closes the browser and shows the payment results to the client.

According to the exemplary embodiment, the user can enter the mobile application after authentication in the PS using the client ID and the password. The mobile application is used for viewing the invoices (unpaid, paid, rejected, etc.), changing the personal data, for controlling the cards list. Each card's ID and name are stored in the mobile application configurations.

A payment receiving portal belongs to the payment service. The payment receiving portal is accessed by a browser or through a special mobile application. The payment receiver (seller) needs to register with the service. The seller provides:

a name of the company, address, phone number(s);
an email and/or a mobile number;
available functions: pre-authorization, correction, cancellation, access to web service;
a corporate card number;
login and password.

Then,
1. The PS sends the one-time passwords to the mobile phone or to the email address;
2. The seller enters the passwords;
3. The PS checks the passwords;
4. The PS registers the seller with a pending status;
5. The PS generates an invoice with the seller's ID for the service fee;
6. The seller pays for the registration;
7. The PS operator receives the payment notification, checks the seller name, enters the seller's bank attributes and sets the limits and rates;
8. The operator activates the seller;
9. The seller receives an activation notification and a digital certificate. The certificate is sent to the email address and the password is sent via SMS.

According to the exemplary embodiment, the login into a payment service portal is implemented using a password authentication or using a digital certificate. The payment service portal provides the following functions:

generation of the invoice (including pre-authorization mode);

correction of the invoice (if the invoice is paid, a partial reverse of the transaction is executed);

cancellation of the invoice (if the invoice is paid, a reverse of the transaction is executed);

payment for a preliminary invoice;

waiting for payment for the invoice (periodic requests);

viewing an invoice list (based on conditions, such as time, amount, description, etc.);

controlling the users operations: adding (login, password, mobile number, available functions), change of a password;

requesting an additional digital certificate;

controlling service operations;

receiving reports (e.g., daily/monthly results, a list of paid invoices, a list of unpaid invoices);

reviewing and editing the attributes.

According to the exemplary embodiment, a web service can be used by sellers (i.e., payment receivers). The web service also belongs to the payment service. The sellers can use the web service to integrate the payment service with their own IT systems. The web service authentication is implemented using the digital certificates of the client and the server. The web service can also implement the following methods:

generation of the invoice (including pre-authorization mode);

correction of the invoice (if the invoice is paid, a partial reverse of the transaction is executed);

cancellation of the invoice (if the invoice is paid, a reverse of the transaction is executed);

checking the invoice status (including waiting for payment);

receiving an invoice list (based on conditions).

According to the exemplary embodiment, the payment service participants have to meet the following conditions:

A bank has to participate in the common payment system (CPS). The transactions between sellers (payment receivers) and buyers (payment senders) are implements through the CPS. The CPS serves as a payment grant for the sellers. The CPS has to support 3D Secure protocol. The authentication is implemented using 3D Secure. The bank can have its own ACS or it can use the ACS of the payment service. In either case, the bank's processing system has to support operations with the ACS. The client has to have a card of the participating bank and a subscription to the 3D Secure. The client has to have a CPS mobile application.

Figure 2:
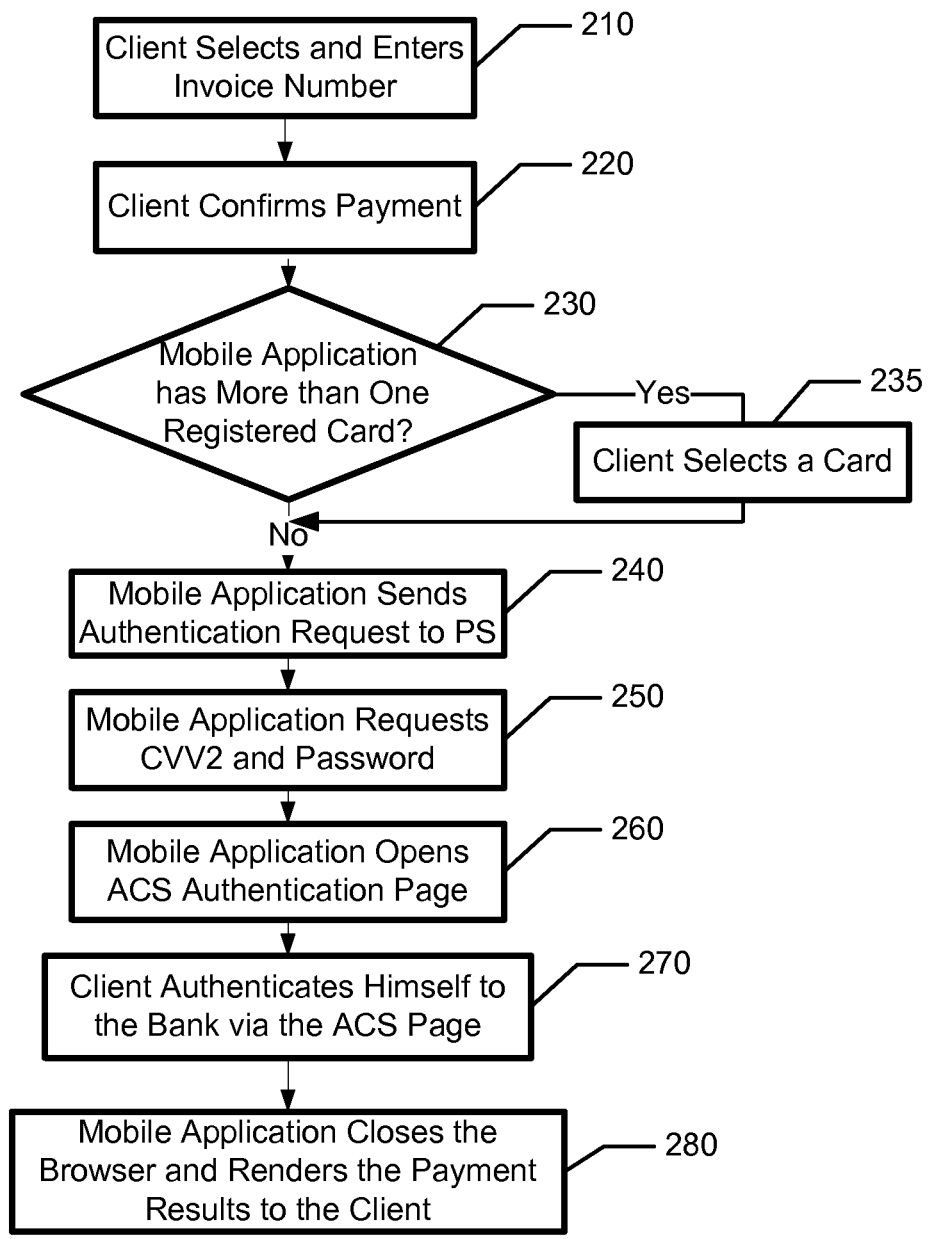
FIG. 2 illustrates an algorithm for payment of an invoice, in accordance with the exemplary embodiment.

FIG. 2 illustrates an algorithm for payment of an invoice, in accordance with the exemplary embodiment. In step 210, the client selects and enters an invoice number using the mobile application. In step 220, the client confirms payment through the mobile application. In step 230, if the mobile application has more than one card registered for the client, the client select a card for paying the invoice in step 235 and the mobile application sends authentication request to Payment Service in step 240. If the user has only one card in step 230, the mobile application sends authentication request to Payment Service in step 240 right away.

In step 250, the mobile application requests CCV2 and a password (if required). The mobile application opens the ACS authentication page in its browser in step 260. The client authenticates himself to the bank via the ACS page in step 270. The mobile application closes its browser and shows the payment results to the client in step 280.

Figure 3:
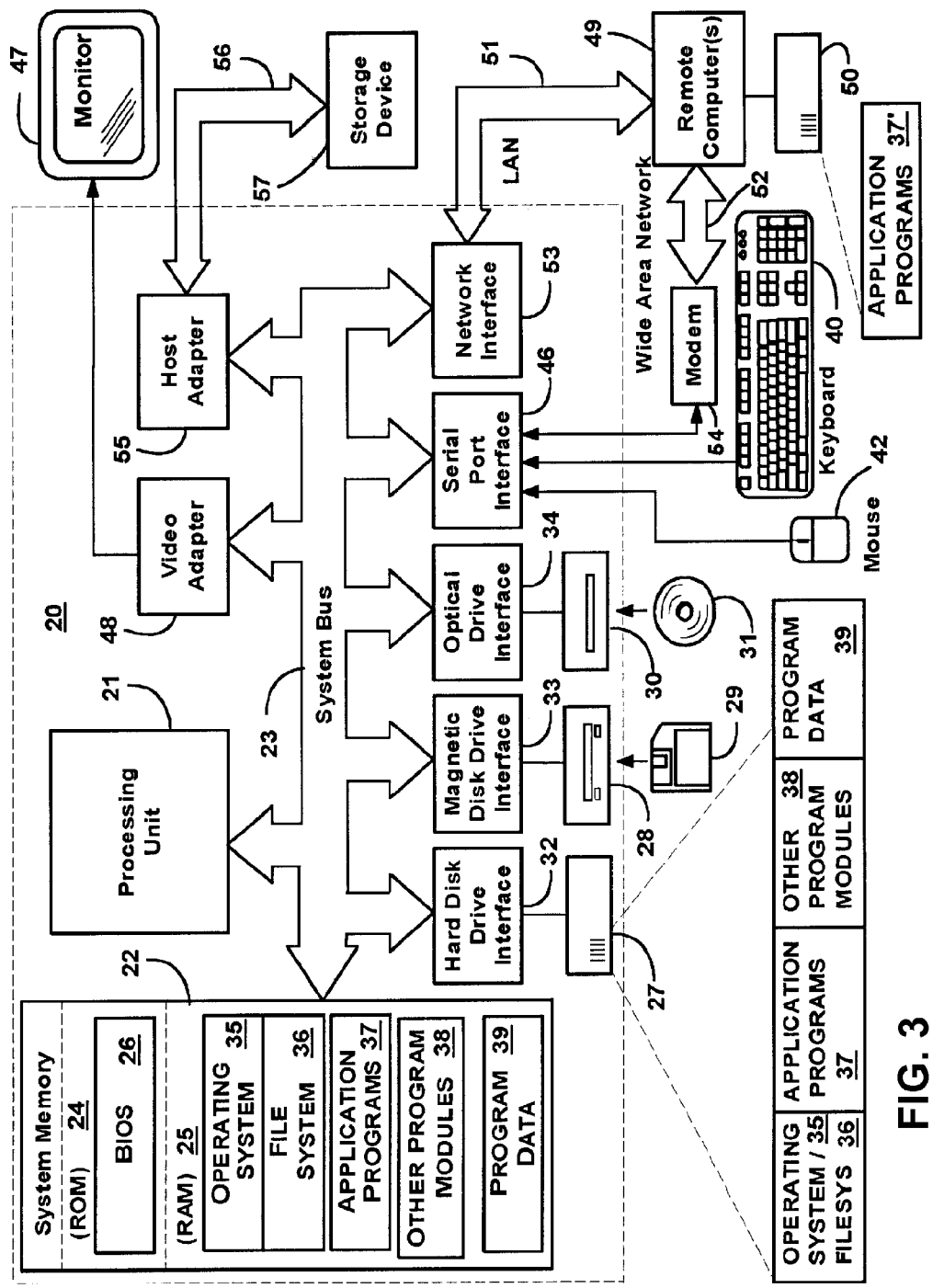
FIG. 3 illustrates a schematic diagram of an exemplary computer or server that can be used in the invention.

With reference to FIG. 3, an exemplary system for implementing the invention includes a general purpose computing device in the form of a personal computer 20 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 20, or portions thereof, may be stored in the remote memory storage device. It will be appreciated that the network connections shown are exemplary and other means of establishing a communications link between the computers may be used.

Figure 4:
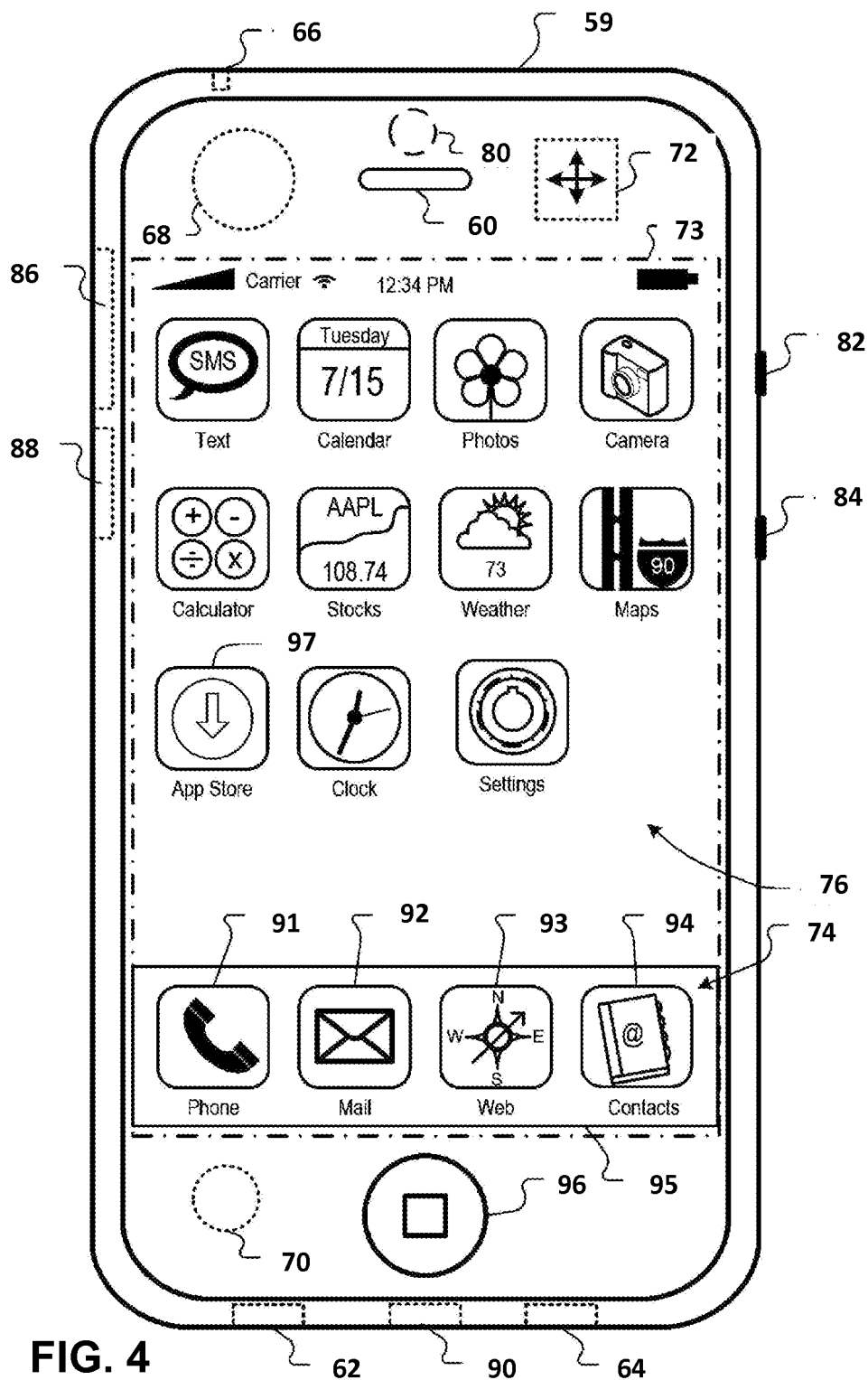
FIG. 4 is a block diagram of an exemplary mobile device that can be used in the invention.

FIG. 4 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94.

In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 5:
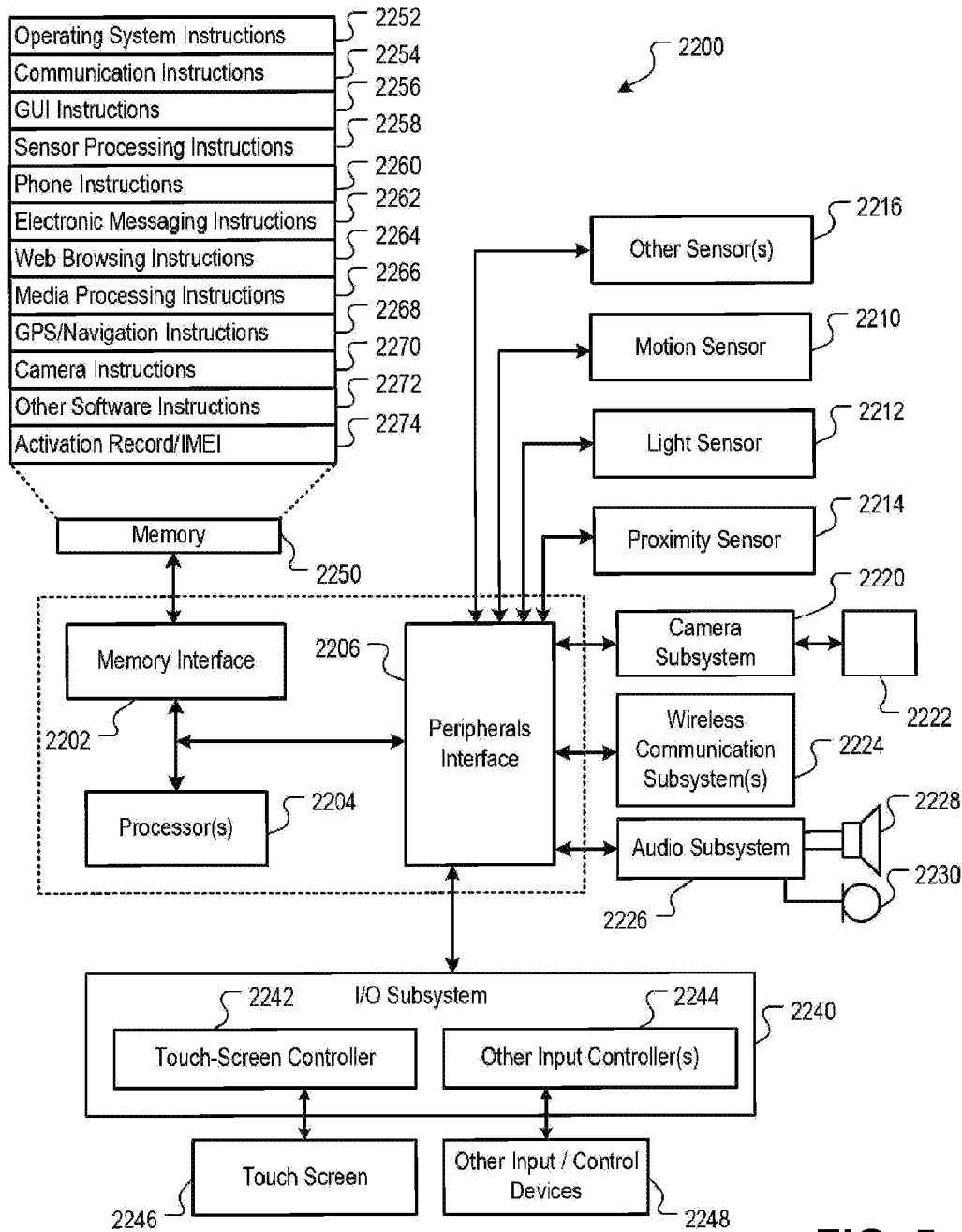
FIG. 5 is a block diagram of an exemplary implementation of the mobile device.

FIG. 5 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate.

For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices. An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described the different embodiments of a system and method, it should be apparent to those skilled in the art that certain advantages of the described method and apparatus have been achieved. In particular, it should be appreciated by those skilled in the art that the proposed method provides for an efficient processing of payments without the use of credit or debit cards.

It should also be appreciated that various modifications, adaptations, and alternative embodiments thereof may be made within the scope and spirit of the present invention. The invention is further defined by the following claims.

What is claimed is:

1. A system for cardless invoice payments using a mobile phone, the system comprising:
    a common payment system (CPS) server connected to a bank processing system;
    an invoice database application executing on the CPS server;
    a transaction engine application executing on the CPS server configured to receive an invoice from a seller, connect to a mobile device and execute payment transactions;
    the transaction engine application executing on the CPS server provides the invoice to a buyer in response to a request from the buyer;
    after providing the invoice to a buyer and after the buyer confirms his intent to pay the invoice, the transaction engine application authenticates the buyer using a 3D Secure ACS (Access Control Server) system of the bank processing system, and in response to a request for authentication by the buyer, the 3D Secure ACS provides authentication fields, including any additional authentication based on configuration of the bank processing system, to be completed by the buyer using a mobile payment application, and
    the mobile payment application executing on the mobile phone of the buyer provides completed fields requested by the 3D Secure ACS system via a webpage generated by the bank processing system and also provides a CVV code to the CPS server;
    the transaction engine application receives an authentication confirmation from the 3D Secure ACS system;
    the transaction engine application receives a payment instruction from the mobile phone of the buyer; and
    the transaction engine application executes the payment transaction by connecting to the bank processing system and transferring funds from a buyer's account to a seller's account.

2. The system of claim 1, wherein the transaction engine application receives the payment instruction from the mobile payment application executing on the mobile phone.

3. The system of claim 1, wherein the CPS server is configured to perform any one or several of:
    generating the invoice;
    correcting of the invoice;
    canceling the invoice;
    paying for a preliminary invoice;
    waiting for payment for the invoice and sending periodic requests;
    displaying an invoice list;
    adding users;
    requesting digital certificate;
    controlling transactions;
    receiving reports; and
    reviewing and editing bank attributes.

4. The system of claim 1, wherein the transaction engine is configured to partially reverse transactions if the invoice is paid in excess.

5. The system of claim 1, wherein the transaction engine is configured to reverse transactions if the invoice is cancelled.

6. The system of claim 1, wherein the CPS server sends a one-time password to the mobile phone of the buyer for registering the buyer.

7. The system of claim 1, wherein the CPS assigns an ID to the buyer for identifying the buyer to the seller.

8. The system of claim 1, wherein the CPS ties the invoice to the buyer's bank account.

9. A method for cardless invoice payment using a mobile phone, the method comprising:
    connecting a common payment system (CPS) server to a bank processing system;
    executing an invoice database application on the CPS server;
    executing a transaction engine application on the CPS server, wherein the CPS server is configured to receive an invoice from a seller, connect to a mobile device and execute payment transactions,
    wherein the transaction engine application provides the invoice to a buyer in response to a request from the buyer;

after providing the invoice to a buyer and after the buyer confirms his intent to pay the invoice, authenticating the buyer, using the transaction engine application and using a 3D Secure ACS (Access Control Server) system of the bank processing system, wherein, in response to a request for authentication by the buyer, the 3D Secure ACS provides authentication fields, including any additional authentication based on configuration of the bank processing system, to be completed by the buyer using a mobile payment application;

executing the mobile payment application on the mobile phone of the buyer to provide completed fields requested by the 3D Secure ACS system via a webpage generated by the bank processing system and also to provide a CVV code to the CPS server; and receiving an authentication confirmation from the 3D Secure ACS system, receiving a payment instruction from the mobile phone of the buyer and executing the payment transaction by connecting to the bank processing system and transferring funds from a buyer's account to a seller's account, all using the transaction engine application.

10. The method of claim 9, wherein the payment for the invoice is made directly from the buyer's bank account.

* * * * *